(12) United States Patent
Ulander (10) Patent No.: US 6,384,766 B1
(45) Date of Patent: May 7, 2002

(54) METHOD TO GENERATE A THREE-DIMENSIONAL IMAGE OF A GROUND AREA USING A SAR RADAR

(75) Inventor: Lars Ulander, Linköping (SE)

(73) Assignee: Totalförsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 09/445,462

(22) PCT Filed: Jun. 15, 1998

(86) PCT No.: PCT/SE98/01147

§ 371 Date: Dec. 20, 1999

§ 102(e) Date: Dec. 20, 1999

(87) PCT Pub. No.: WO98/58275

PCT Pub. Date: Dec. 23, 1998

(30) Foreign Application Priority Data

Jun. 18, 1997 (SE) .............................................. 9702331

(51) Int. Cl.⁷ .............................................. G01S 13/90
(52) U.S. Cl. .................... 342/25; 342/191; 342/192; 342/194; 342/195
(58) Field of Search .......................... 342/25, 159, 162, 342/189, 190, 191, 192, 194, 195, 196

(56) References Cited

U.S. PATENT DOCUMENTS

| 4,292,634 A | * | 9/1981 | Wu et al. ....................... 342/25 |
| 4,321,601 A | | 3/1982 | Richman ....................... 342/25 |
| 4,727,373 A | | 2/1988 | Hoover ....................... 342/25 |
| 4,965,582 A | * | 10/1990 | Hellsten ....................... 342/25 |
| 4,975,704 A | | 12/1990 | Gabriel et al. ................. 342/25 |
| 5,179,383 A | * | 1/1993 | Raney et al. .................. 342/25 |
| 5,260,708 A | | 11/1993 | Auterman ..................... 342/25 |
| 5,394,151 A | | 2/1995 | Knaell et al. .................. 342/25 |
| 5,463,397 A | | 10/1995 | Frankot ....................... 342/25 |
| 5,488,373 A | * | 1/1996 | Hellsten ....................... 342/25 |
| 5,608,405 A | * | 3/1997 | Pritt ............................. 342/25 |
| 5,673,050 A | * | 9/1997 | Moussally et al. ............. 342/22 |
| 5,726,656 A | * | 3/1998 | Frankot ....................... 342/25 |
| H1720 H | * | 4/1998 | Chen ........................... 342/25 |

* cited by examiner

Primary Examiner—John B. Sotomayor
(74) Attorney, Agent, or Firm—Jacobson Holman, PLLC (57) ABSTRACT

The present invention relates to a method for generating a three-dimensional image of a ground area by means of a radar with a synthetic aperture, a SAR radar, which is supported by a platform moving in an essentially rectilinear manner. The method is characterized by the following steps.

Advancing the platform such that at least two images of the ground are created with great difference in the angle of illumination.

Transmitting radar pulses with a fractional bandwidth which is larger than or equal to 0.1, and using in the computations an aperture angle which is larger than or equal to 0.1 radians.

Detecting the reflected radar pulses with amplitude and phase.

For each pulse, measuring and storing the position of the antenna that transmits and the antenna that receives the pulse.

Computing a two-dimensional SAR signal per synthetic aperture.

Starting from the amplitude and phase of the two SAR signals as well as position data for the antennae, reconstructing a three-dimensional position description of the area relative to antenna position data.

10 Claims, 6 Drawing Sheets

Small fractional bandwidth

Large fractional bandwidth

Computational volume / Ground surface

METHOD TO GENERATE A THREE-DIMENSIONAL IMAGE OF A GROUND AREA USING A SAR RADAR

BACKGROUND OF THE INVENTION

1. Field of the Invention

The present invention relates to a method for generating a three-dimensional image of a ground area using a radar with a synthetic aperture, a SAR radar. Important applications are, inter alia, three-dimensional positioning of the ground surface and/ or objects close to the ground surface, topographic mapping where no ground check points are available, and topographic mapping of various ground layers, especially underlying ground surface in wooded areas.

2. Description of the Related Art

SAR is an established technique for two-dimensional ground mapping with a high resolutions in this technique, short radar pulse are transmitted, or longer pulses which am compressed using a pulse compression technique, from a platform, e.g. aircraft or satellite, moving along a nominal straight path over the area of ground that is to be studied, and the change of the return signal during the movement of the platform is analysed.

The short pulse allows a high range resolution, transversely of the straight path, while a linear combination of the signals along the straight path results in a high azimuth resolution, along the straight path. The latter is equivalent to an extended antenna aperture, which is synthesised by signal processing. The condition for achieving a high azimuth resolution is that the relative amplitude and phase of the transmitted and received radar pulse are known, and that the position of the antenna is measured with great accuracy along the aperture.

The SAR technique has in realised over a wide frequency band, between about 20 MHz and 100 GHz, which corresponds to electromagnetic wavelengths between 3 mm and 15 m. Since the interaction of the reflecting structures with the electro-magnetic wave is wavelength-dependent the imaging of various surface structures differs to a considerable extent according to the frequency at which they are illuminated.

As a rule, the penetration of the wave and also the size of the dominating scattering elements decrease for higher frequencies, both being of wavelength order. For woods, for instance, this means that it is fundamentally transparent for low frequencies (<100 MHz) while high frequencies (>10 GHz) image the tree tops. By a suitable selection of frequency, it is thus possible to image layers on different levels in vegetation. Layers below th ground surface can be reproduced in similar ways. Polarisation and angle of incidence also affect the penetration of the wave and the scattering elements, even if this dependence is normally subordinated to the wavelength dependence.

Each point in the grid of the SAR image corresponds to a two-dimensional position defined by the transverse distance to a ground object and its position along the path. The position thus is unambiguous if the topography of the ground surface is known except for its mirror image through the flight path. The latter, however, can be distinguished by using the directivity of the antenna system.

Figure 1:
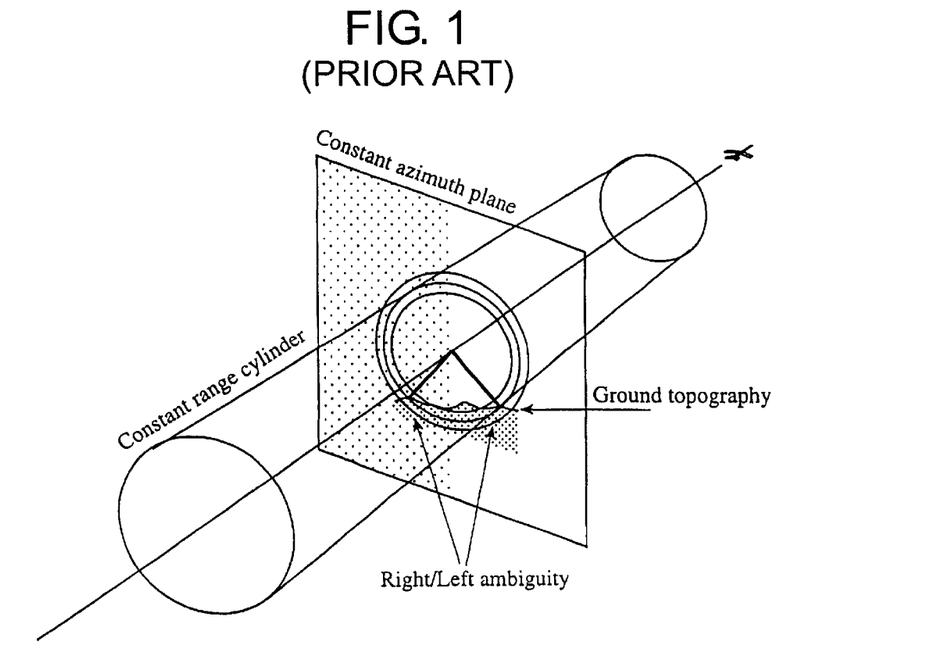
FIG. 1 shows a prior-art method for SAR imaging.

The position of the ground is thus obtained as the intersection between a circular cylinder with the flight path as symmetry axis, the range cylinder, and two surfaces, one of which is a semiplane perpendicular to the cylinder axis, the azimuth plane, and the other represents the ground surface, see FIG. 1. This fact also means that the topography must be known a priori if the SAR image is to be registered to a map projection, which in most cases is a requirement made by those who are going to use the images in practice.

If, on the other hand, the topography of the ground surface is not known, the two-dimensional geometry of the SAR image means that ground structures with the same range and azimuth co-ordinates cannot possibly be distinguished from each other. It would thus be great progress of the SAR technique could be improved such that also the topography of the ground surface could be unambiguously determined on the basis of the SAR signal.

Figure 2:
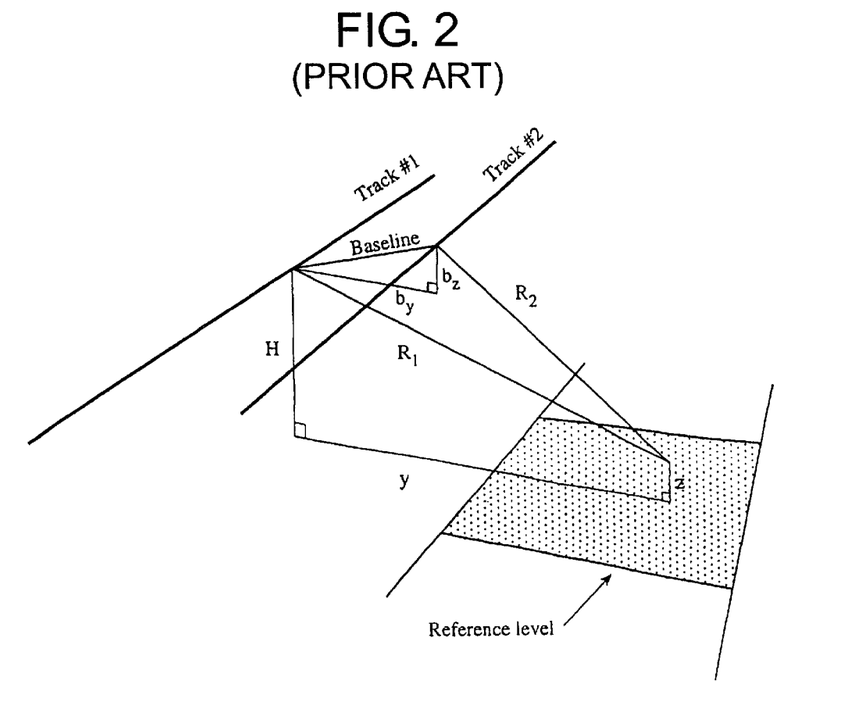
FIG. 2 shows a prior-art method for narrow band SAR interferometry imaging.

Narrow band SAR interferometry and stereo SAR are prior-art techniques for approximately determining the topography of the ground. Here a combination is made of measurements from two parallel-displaced paths, which is illustrated in FIG. 2. These techniques are based on the use of narrow band SAR systems which in the interferometry case result in ambiguity and in the stereo case result in insufficient height resolution. They are both based on the principle that the difference in range between two surface structures differs in the two images owing to the change in measurement geometry which is related to a difference in height. By using narrow band SAR, there will, however, be speckle noise in the image owing to the fact that the geometric resolution is much greater than the electromagnetic wavelength.

In these cases, the resolution volume generally contains multiple scattering elements which each backscatter the incident wave, which are superposed with amplitude and phase in the reconstructed image element. Superposition is equal to interference between to backscattered waves, and the resulting ground reflex thus is dependent on the angle of observation of the radar relative to the resolution volume.

In narrow band SAR where the resolution is much greater than the wavelength, the interference pattern changes very rapidly when the direction of observation changes. If, on the other hand, the resolution is of wavelength size, such as in broadband SAR, the direction of observation can change considerably without significantly affecting the interference pattern.

Figure 3:
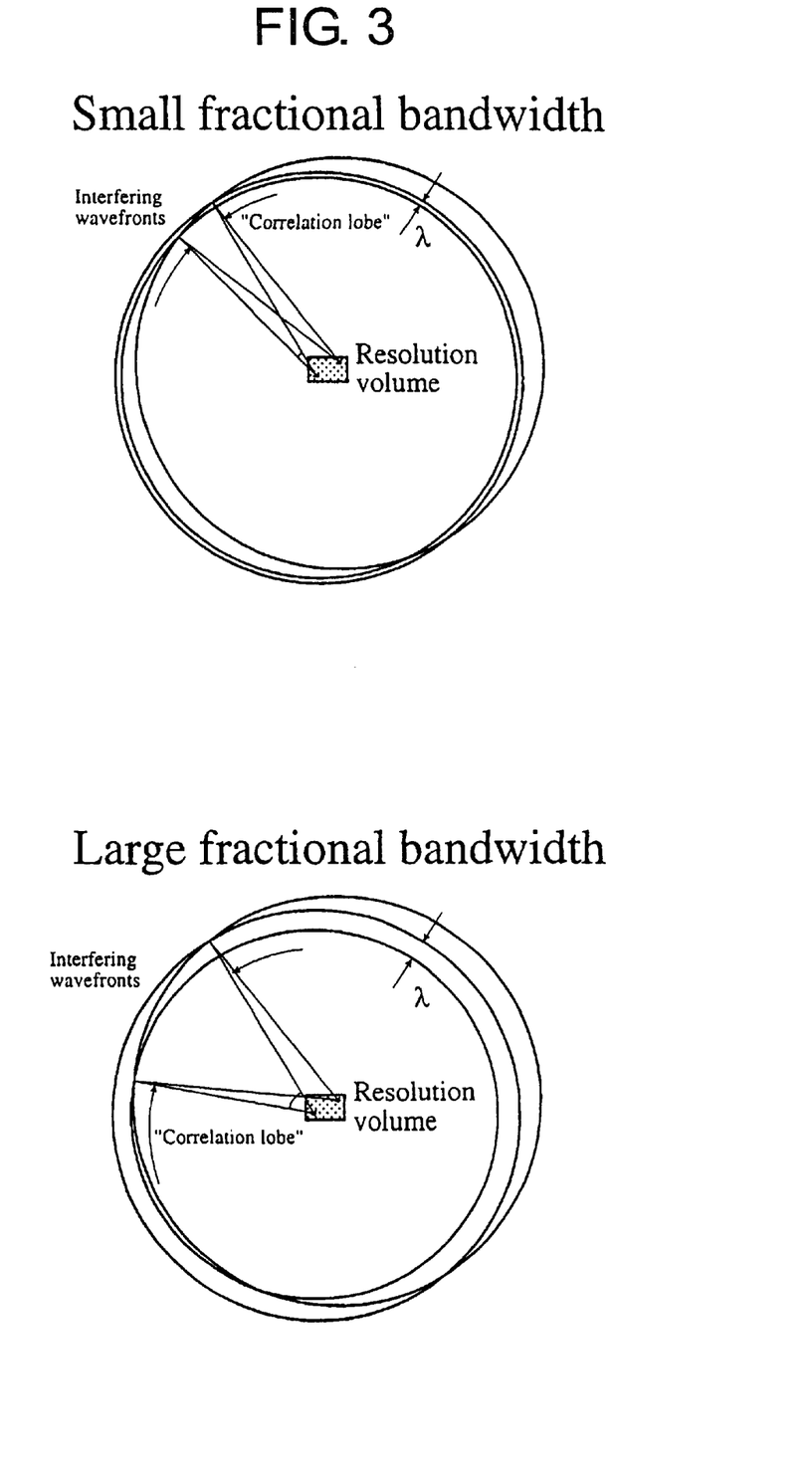
FIG. 3 shows the difference between narrow band and broadband SAR imaging.

Normally the resolution volume contains many independent scattering elements, which results in random amplitude and phase between different resolution cells, so-called speckle noise. The interference pattern is reproducible if exactly the same measurement geometry is repeated, but it changes if the angle of observation or the character of the ground changes. The angle through which the interference pattern is correlated in inverse proportion to the extent of the resolution volume and is in proportion to half the wavelength, which is illustrated in FIG. 3.

Narrow band SAR interferometry uses the fact that the speckle noise is correlated when the change in measurement geometry is small. In this way, changes in the difference in range are determined with an accuracy which is a fraction of a wavelength. It is disadvantageous, however, that the measurement of the difference in range is ambiguous with a multiple of half the wavelength. If the maximum acceptable change in measurement geometry with retained correlation is taken into consideration, defined as a change in range difference between neighbouring resolution cells which is smaller than half the wavelength, the height resolution is of the same order as the range resolution. In practice, this means a vertical error in the order of 1–10 m for the currently most advanced narrow band SAR systems. A drawback of the method, however, is the ambiguity which must be solved by using special algorithms, "phase unwrapping". A further drawback is that a measurement error of wavelength size, for instance an extra delay in the atmosphere, results in a great vertical error. To determine an unambiguous topographic height manual corrections therefore are necessary.

Narrow band stereo SAR uses the fact that certain structures can be recognised in the amplitude images. However, the speckle pattern is not correlated in the two images, which means that only relatively large structures can be measured. By amplitude correlation over the image, the distances to the structure in the two images are thus determined, which is converted to a height. Stereo SAR is disadvantageous above all by the speckle noise in the two images being uncorrelated, which results in the range difference being only determinable with an error which is considerably greater than the range resolution. In practice, this means that the vertical error is in the order of 10–100 m. A further drawback of the stereo technique is that it is based on the recognition of noisy structures in two images, which requires robust pattern recognition algorithms.

SUMMARY OF THE INVENTION

In view of the foregoing, a need exists to improve the SAR technique such that the topography of the ground surface could be determined on the basis of the SAR signal in an unambiguous manner and with great accuracy. The objective of the present invention is to solve this problem, which is achieved through a method for generating a three-dimensional image of a ground area using a synthetic aperture radar (SAR) supported by a platform moving in an essentially rectilinear manner. The method includes the steps of advancing the platform such that at least two images of the ground are created with a large difference in the angle of illumination, and transmitting radar pulses with a fractional bandwidth which is larger than or equal to 0.1, using in the computations an aperture angle which is larger than or equal to 0.1 radians. The method continues by detecting the reflected radar pulses with amplitude and phase and, for each pulse, measuring and storing the position of the antenna transmitting and the antenna receiving the pulse. A two-dimensional SAR signal per synthetic aperture is computed and, starting from the amplitude and phase of the SAR signals as well as position data for the antennae, the method proceeds by reconstructing a three-dimensional position description, topography, of the area relative to antenna position data, the topography being inverted from the measured SAR signals starting from a geometric signal model with the topography of the area and the position data of the antennae as input parameters, using the fact that the amplitude of the signals gives a topography with a coarse resolution but with a limited depth of focusing, which together with the phase of the signals gives an unambiguous topography with a fine resolution.

The method of the present invention may further include advancing the platform such that at least two images of the ground are created with a great difference in the angle of incidence, which takes place from antenna positions that differ by a distance perpendicular to the platform path by the platform moving in time successively along two essentially parallel-displaced paths. The platform may also be advanced such that at least two images of the ground are created with a great difference in the angle of incidence, which takes place from antenna positions that differ by a distance perpendicular to the platform path by transmitting simultaneously or alternatingly radar signals from two antennae on the platform.

Further embodiments include back-projecting the SAR signals to a three-dimensional computational grid along circles defined by the intersection between range cylinders and azimuth planes for each straight path, i.e. for each grid point, a value is set that is given by interpolation of the SAR signals to the range and azimuth positions of the given point. The method may be further characterized by maximizing, with a view to determining the vertical position in each horizontal position, in these horizontal positions the cross-correlation of the amplitude of the back-projected SAR signals in respect to the vertical position. A more accurate vertical position may also be determined in each horizontal position by determining in each horizontal position the vertical position for which the back-projected SAR signals have the same phase value and which is closest to the previously determined vertical position.

Additional embodiments include filtering the SAR signals starting from the local inclination and the SAR measuring geometry such that the ground-projected resolution elements become identical. The method may be carried out at least at two center frequencies, which gives the position of different vegetation layers and/or ground layers. Radar pulses may be transmitted and received at least at one higher center frequency, with the transmission taking place with a normal bandwidth.

BRIEF DESCRIPTION OF THE DRAWINGS

The invention will now be described in more detail with reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is based on the using of signals from one or more SAR systems with a large fractional bandwidth and a large aperture angle of a platform which travels along at last two offset straight paths, or alternatively the using of at least two separated antenna systems. One alternative is that the platform is moved along a curvilinear path.

In the first-mentioned cases, the difference in angle of illumination from the straight paths and the antennae, respectively, transversely of the travelling direction should be as great at possible to obtain a maximum measuring sensitivity to topographic height in the last-mentioned case, the path should, however, be such that the deviation from a straight path is great, for instance, by the platform travelling in a circle or along the four sides of a square.

The difference between the two cases is that the generation of a SAR image from a curvilinear path is dependent on the topography of the area, which, however, is not the case with a straight path. The latter thus is an unambiguous two-dimensional inverse problem while the former requires—in the cases where the topography is assumed to be unknown—repeated generations of images and an assessment whether objects are correctly focused in image.

In the description below it is assumed that the platform nominally travels along two parallel-displaced straight paths, which simplifies the determination of two SAR images and the topography of the area. The paths need not be exactly straight or parallel. Moderated deviations can be corrected.

The principle of the invention is based on the SAR and stereo geometries illustrated in FIGS. 1 and 2. The SAR system in FIG. 1 generates a two-dimensional image of the ground surface in azimuth and range co-ordinates. Separation of signals originating from the left and the light side, respectively, of the flight path is effected by antenna directivity or the like. Two SAR images are then used to provide a three-dimensional positioning of the two range measurements R1 and R2 in FIG. 2.

The invention is also based on the image properties that follow from the fact that the SAR system utilises a large fractional bandwidth, which is illustrated in FIG. 3. A SAR image with a large fractional bandwidth has a resolution of the same order as the wavelength and does not change its image texture to any considerable extent when the angle of incidence changes since the wavelength difference between different scatterers within a resolution element is of the same order as the wavelength. The latter means that two SAR images have high cross-correlation for all spatial ground frequencies up to the resolution limit although in FIG. 2 the angle between the two paths, seen from the ground, is great. High correlation, however, requires that the scatterers in the resolution element be located within about a wavelength from the ground surface, which is normally the case.

Figure 4:
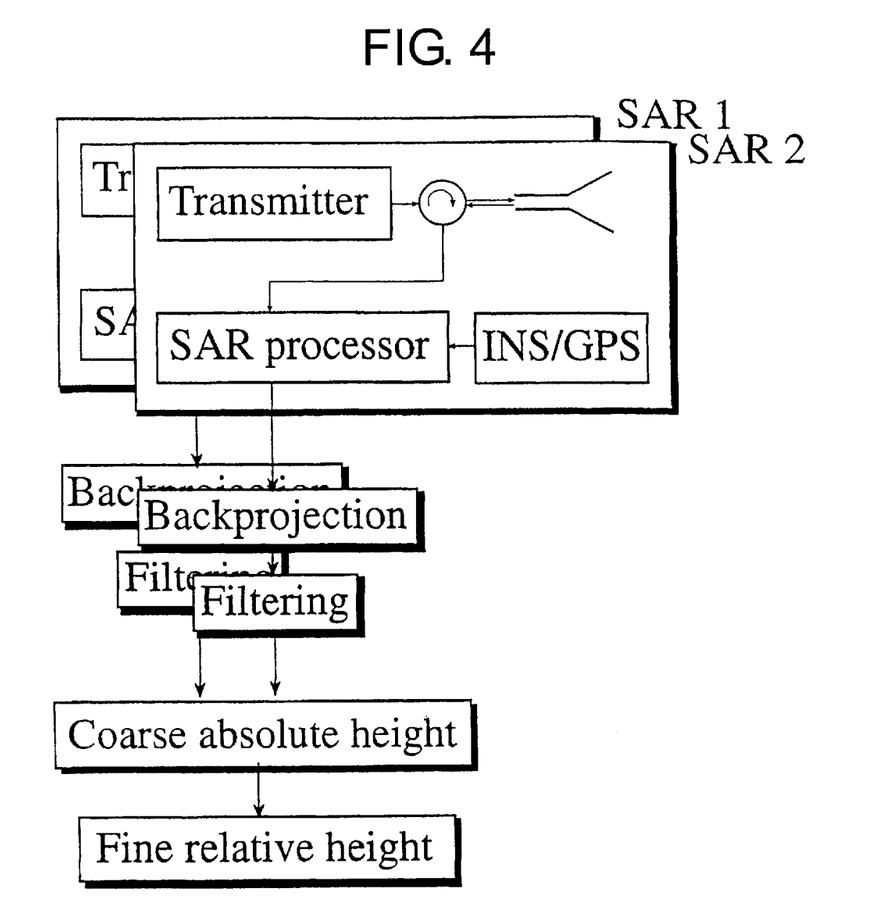
FIG. 4 shows a principle diagram of the invention.

The Invention is schematically summarised in FIG. 4, in which the two SAR signals SAR1 and SAR2 are generated and then combined to generate a three-dimensional position description of the ground.

Radar raw data, i.e. received ground return after each transmitted pulse, are registered together with the position of the platform along a nominal straight path. The position is to be registered with an inaccuracy better than about a tenth of a wavelength, which, for instance, can be effected by GPS (Global Positioning System) and/or INS (Inertial Navigation System) supplemented with signal processing for autofocusing. Further radar raw data are registered from one or more offset paths. The offset should be selected to be as great as possible to achieve maximum measuring sensitivity but still guarantee correlated SAR data.

With a view to generating SAR images from radar raw data, use is made of one of several known signal processing methods for large bandwidth and wide beam SAR. These can be transform methods (e.g. Fourier-Hankel), time domain methods (global back projection) or hybrid methods (local back projection). The choice of method depends on, inter alia, wavelength, measuring geometry, desired size of image, calculation and memory requirements.

Swedish Patent 8406007-8 (456,117) and the corresponding PCT Application SE85/00490, resulting in, inter alia, U.S. Pat. Nos. 4,886,446 and 4,965,582, and Swedish Patent Application 9503275-1 and the corresponding PCT Application SE96/001164, which are incorporated by reference herein, disclose embodiments of two-dimensional broadband SAR imaging.

The transform method is the most rapid one and is preferred if the measuring geometry does not deviate considerably from a straight path. A drawback of the transform method is that it requires the entire amount of data to be processed at the same time, which may place great demands on memory space. The time domain method, however, is preferred when straight path deviations must be corrected or when the demands for memory space become too great.

However, the hybrid method is often the method preferred in practice and represents a compromise between the two above-mentioned methods.

Figure 5:
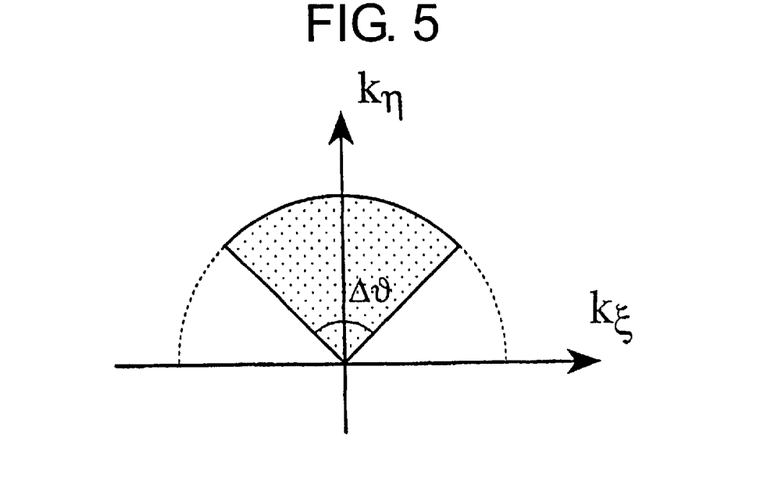
FIG. 5 shows a transfer function used in the invention.

After the signal processing, the SAR images can be characterised by a locallised impulse response $q=q(\xi, \eta)$ where $\xi$ and $\eta$ are azimuth and range position, respectively. The corresponding transfer function is designated $Q=Q(k_\xi, k_\eta)$ and is illustrated in FIG. 5 for a SAR system with an aperture $\Delta\theta$. The aperture angle is the angle seen from the ground, within which data are processed. An applicable model for the SAR signal g is a convolution of the reflectivity function f of the ground and the impulse response q according to $$g(\xi, \eta) = [f * q](\xi, \eta) = \sum_i f_i q(\xi, \eta - r_i) \qquad (1)$$

wherein the sum is over all scatters and $\eta$ is the transverse distance to scatterer i.

Since the positions of the two straight paths are assumed to be known in a reference system, the two SAR Images can be combined to determine the position of the ground in the same reference system. A requirement however, is the possibility of identifying the same object in the two SAR images. However, it is as a rule difficult to unambiguously identify in the second image the equivalence of an object in the first image owing to the enormous amount of similar objects that are available for comparison, and the presence of image noise. The invention therefore uses the fact that in general a collection of objects is close to a local tangent plane.

Figure 6:
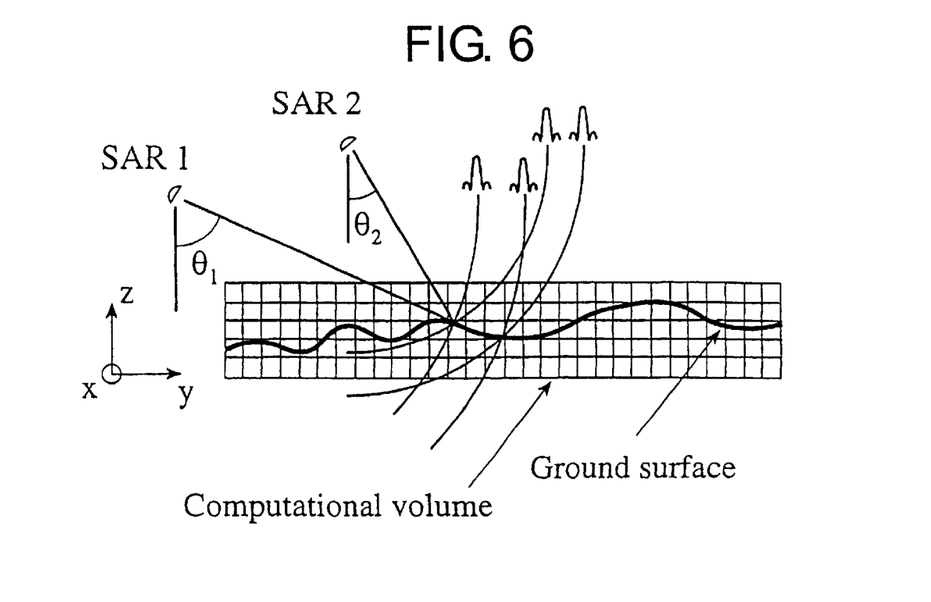
FIG. 6 shows an inventive back projection of SAR signals within a computational volume comprising the desired topography.

By way of introduction, a computational volume is defined, which is amply sufficient in the vertical direction to circumscribe the desired topography, see FIG. 6. In practice, the total computational volume is suitably divided into small subvolumes so as to be more easily processible in terms of computation. The first step is to back project, on a three-dimensional computational grid in this subvolume, the SAR signals, i.e. each grid point assumes the value obtained by interpolation for each SAR signal with the same range and azimuth co-ordinates.

Back projection implies that signals are projected back to all conceivable source points for the reflected wave, i.e. along circles defined by the intersection between the range cylinder and the azimuth plane from the respective paths, which is illustrated in FIG. 6. The interpolation of to SAR signal is an essential operation and is effected, for instance, by sinc interpolation. The back projection defines a scalar field h=h(x,y,z) according to $$h(x, y, z) = g[\eta(y, z)] = \sum_i f_i q\left[\sqrt{(x-x_0)^2 + (y-y_0)^2 + (z-z_0)^2} - r_i\right] \quad (2)$$

wherein the position of the straight path is defined by $r_g$. It should be noted that the back projection does not require the straight paths to be parallel, but the method also functions with non-parallel paths.

After the back projection, the two SAR signals from a specific object will coincide exactly in the grid point corresponding to its three-dimensional position. The signals coincide also in the mirror image thereof through the plane defined by the two straight paths, but one of these points can in practice be excluded after a probability assessment.

The second step utilises the principle that neighbouring objects are in most cases positioned along or in the vicinity of a local tangent plane. The local cross-correlation between the two back-projected signals is calculated for different conceivable tangent planes with a centre in a certain grid point. Then the maximum correlation and the corresponding normal direction of the tangent plane are determined. The same calculation is now carried out for the remaining grid points as a function of the vertical co-ordinate z and the height which gives the greatest maximum correlation is assumed to represent the average height of the horizontal coordinates x and y.

In the same manner the average height is determined for all horizontal co-ordinate points, which together result in a first rough determination of the ground topography. The cross-correlation between the SAR signals from two straight paths can thus be written with a surface integral over the tangent plane $\Delta S$ according to $$\int_{\Delta S} h_1 h_2^* dS = \sum_{i,j} f_i f_j^* \int_{\Delta S} q_1[\xi_1, \eta_1 - r_i] q_2^*[\xi_2, \eta_2 - r_j] dS \quad (3)$$

wherein the impulse responses $q_1$ and $q_2$ can be imagined to be different (see below). The expectation value for the correlation can be calculated with an assumption of independent scatterers according to $$E\left\{\int_{\Delta S} h_1 h_2^* dS\right\} = \sum_i E\{|f_i|^2\} \int_{\Delta S} q_1[\xi_1, \eta_1] q_2^*[\xi_2, \eta_2] dS \quad (4)$$

Figure 7:
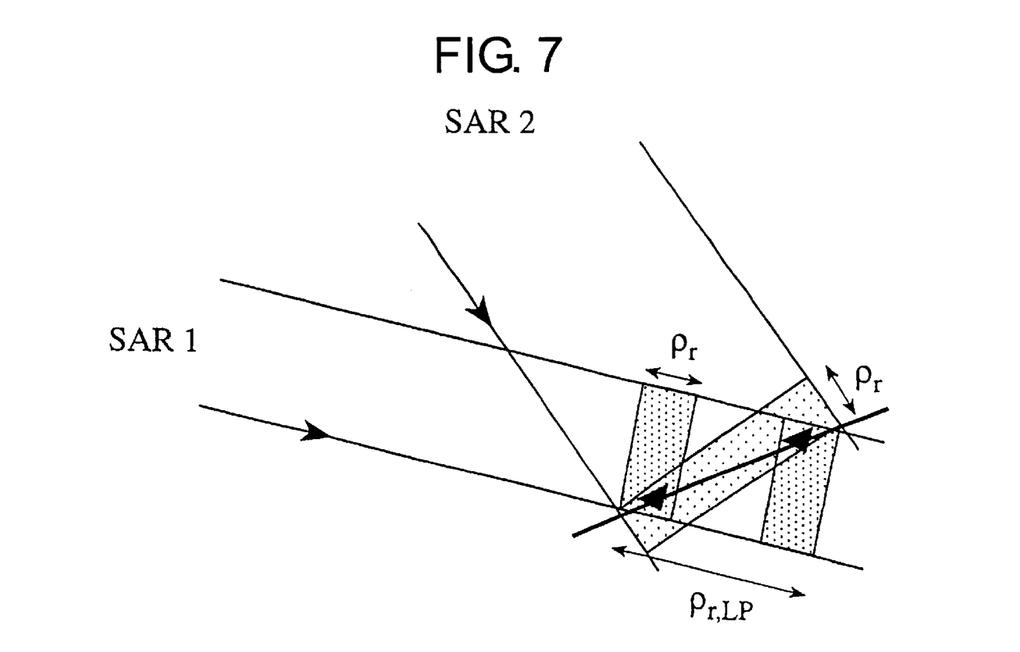
FIG. 7 shows how two objects which are resolved in one direction need not be resolved in another direction.
Figure 8:
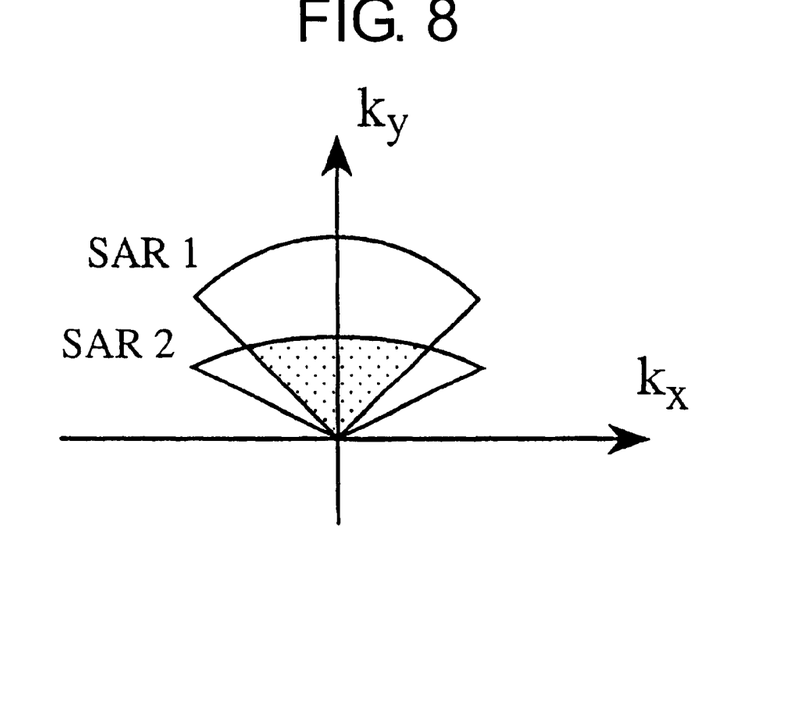
FIG. 8 shows how according to the invention two SAR images are filtered over the same area from offset paths.

The two SAR signals from one and the same ground area are not quite identical since they are measured with the same range resolution but from different directions. Two objects which are resolved in one direction are not necessarily resolved in another direction, see FIG. 7. The third stop therefore is to filter the images such that both obtain the same impulse responses projected on the ground, which is illustrated in FIG. 8. Of course, this deteriorates the range resolution, but results in an increase of the cross-correlation. The filter parameters are determined in each grid point by the normal direction of the tangent plane which was calculated in the second step above. In the case of non-parallel paths, the signals are filtered correspondingly such that the ground-projected impulse responses become equal.

Optimisation of the cross-correlation as described above is suitably carried out on the basis of the demodulated SAR signals. This, however, results in poorer resolution than if the cross-correlation had been effected on the carrier wave signals. In a second step, the vertical measurement can thus be refined by determining the height where the back projected SAR signals have identical phase values and which is closest to the previously determined vertical position. Unambiguity for the last vertical measurement requires that the fractional bandwidth be larger than about 0.1 since otherwise the method passes into the conventional interferometry technique. An alternative to dividing the vertical measurement into two parts is instead to directly maximise the cross-correlation for the carrier-wave-modulated SAR signals. The correlation coefficient is in this case an oscillating function, whose maximum value unambiguously can be determined on the same conditions as before.

Correlation optimisation and signal filtering as described above are dependent on each other, which means that a number of iterations may be necessary in order to achieve the desired result.

Figure 9:
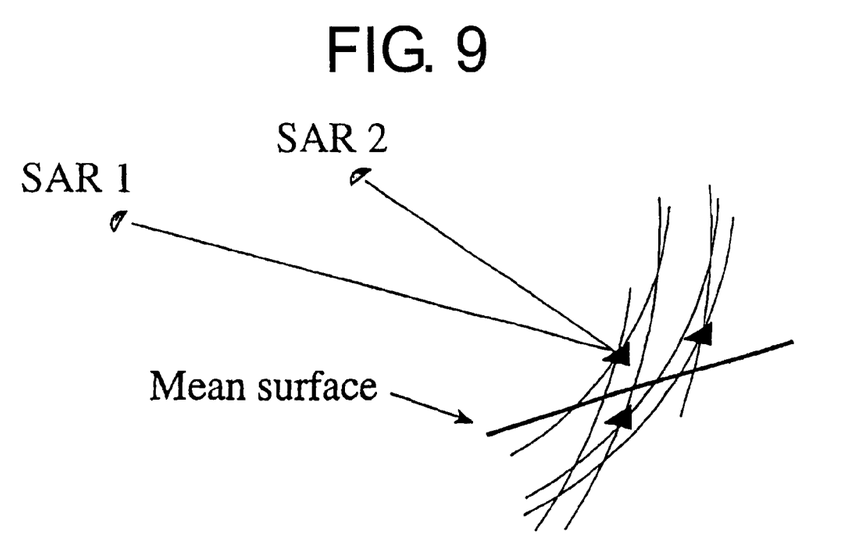
FIG. 9 shows how two objects are matched according to the invention.

The fourth and final step aims at determining the height of individual objects. To achieve this, an object in one image must be matched with the same abject in the other image. This can be Carried out by starting from the rough topography model above and matching objects which have a minimum vertical deviation therefrom. Two objects are thus matched if their respective range curves intersect adjacent to the topography model, see FIG. 9. Further criteria on the basis of e.g. amplitude and geometric shape can be used to match the objects. The vertical measurement is now carried out by determining the height where the two objects coincide.

The inaccuracy in the first rough vertical determination depends on range resolution and stereo geometry and is directly proportional to the "depth of focus" $\Delta h_1$. The latter is defined as the height interval, within which the impulse responses from a point object overlap, which for the case with parallel paths is given by $$\Delta h_1 = \frac{2\rho_{gr}}{\frac{1}{\tan\theta_2} - \frac{1}{\tan\theta_1}} \quad (5)$$

wherein $\rho_{gr}$ is the ground-projected range resolution after filtration according to FIGS. 7 and 8, and the angles are defined according to FIG. 6. The vertical error is determined $\Delta h_1$, the signal-to-noise ration and the number of independent measuring values included in the cross-correlation. With a signal-to-noise ratio of 10 dB and 10 independent measuring values, a vertical error in the order of a tenth of $\Delta h_1$ is obtained.

The inaccuracy in the second refined height determination depends in a similar manner on wavelength and stereo geometry. It is directly proportional to "the depth of ambiguity" $\Delta h_2$, i.e. the height interval corresponding to a phase shift of $2\pi$ a radians, which for the case with parallel paths is given by $$\Delta h_2 = \frac{\lambda_{c,gr}/2}{\frac{1}{\tan\theta_2} - \frac{1}{\tan\theta_1}} \quad (6)$$

wherein $\lambda_{c,gr}$ is the ground-projected centre wavelength after filtration. The vertical error is determined by $\Delta h_2$, the signal-to-noise ratio and the number of independent measuring values. At a signal-to-noise ratio of 10 dB and 10 independent measuring values, a vertical error in the order of a tenth of $\Delta h_2$ is obtained.

In practice it is not possible to achieve an ideal transfer function according to FIG. 5 since this requires that all frequencies from DC up to the maximum frequency be used. The invention is, however, not limited to this ideal case and functions also when a minimum frequency is assumed, provided that the fractional bandwidth is still large (in practice: $\Delta f/f_{max} > 0,1$)

The transfer function according to FIG. 5 is modified and becomes a surface between two circles and two diagonals, where the smallest circle corresponds to the minimum frequency. The implementation of the filtration in FIGS. 7 and 8 is consequently modified and becomes a bandpass filtration instead. The height inaccuracy is slightly deteriorated for a given geometry owing to a decrease of the correlation between the images, but is still of the same order.

When the fractional bandwidth decreases further ($\Delta f/f_{max} < 0,1$), the invention gradually passes into the previously mentioned interferometry technique. To achieve a high correlation between the SAR images, the difference in angle must now be so small that the vertical error according to formula (5) becomes too great. In practice, use is therefore made of merely phase interference between the SAR images to determine the difference in range, which results in sufficient height accuracy according to formula (6), but has the drawback that the height becomes ambiguous. The height accuracy, however, will at its best be of the same order as the range resolution since the maximum difference in angle balances the improved measuring accuracy for the difference in range.

In addition to the demand for a large relative bandwith, as discussed above, the invention requires a large aperture angle (in practice $\Delta g > 0,1$ radians). The latter means that the resolution also in azimuth is of the wavelength size, which provides unambiguity also for the case with non-parallel straight paths. The aperture angle for narrow band SAR is smaller than 0.1 radians, which results in ambiguity.

The invention is also applicable to the case with non-parallel straight parts, the denominator in formulae (5) and (6) being replaced with $$\sqrt{\frac{1}{\tan^2\theta_1} + \frac{1}{\tan^2\theta_2} - \frac{2\cos\alpha}{\tan\theta_1\tan\theta_2}},$$

wherein $\alpha$ is the azimuth angle between the straight paths and the angles of incidence $\theta_1$, $\theta_2$ are defined in the vertical plans. A difference in angle of illumination is thus achieved by a difference in angle in azimuth and/or incidence.

Figure 10:
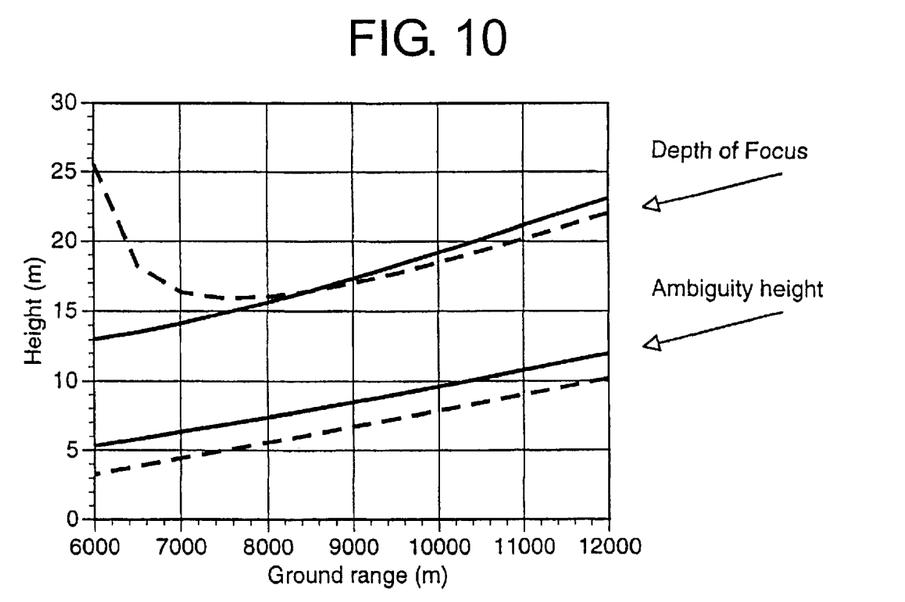
FIG. 10 shows theoretical values of depth of focus and depth of ambiguity for horizontal ground and upward slope.

An example of SAR and geometry parameters for a stereo measurement on the VHF band is summarised in Table 1. The geometry is defined according to FIG. 2 The basis is the air-borne CARABAS II system within the band 25–85 MHz and with horizontal polarisation on both transmission and reception, which gives good penetration properties in woods. Theoretical values of the depth of focus and ambiguity are illustrated in FIG. 10 for horizontal ground by a full line and for 25° upward slope by a dashed line. The illustrated ground range interval, y in FIG. 2, corresponds to angles of incidence in the ranges of 39–63° and 63–76°, respectively, i.e. the difference in angle varies over the band in the range of 13–24°. The expected inaccuracy in the height measurement thus is in the order of 1 m over the entire swath width.

TABLE 1

Example of broadband stereo SAR on the VHF band

| | |
|---|---|
| Centre frequency $f_c$ | 55 MHz |
| Bandwidth B | 60 MHz |
| Aperture angle $\Delta\theta$ | 90° |
| Resolution | 4 m² |
| Polarisation | HH |
| Flying height H | 3000 m |
| Vertical base line $b_z$ | 2000 m |
| Horizontal base line $b_y$ | 2000 m |

Figure 11:
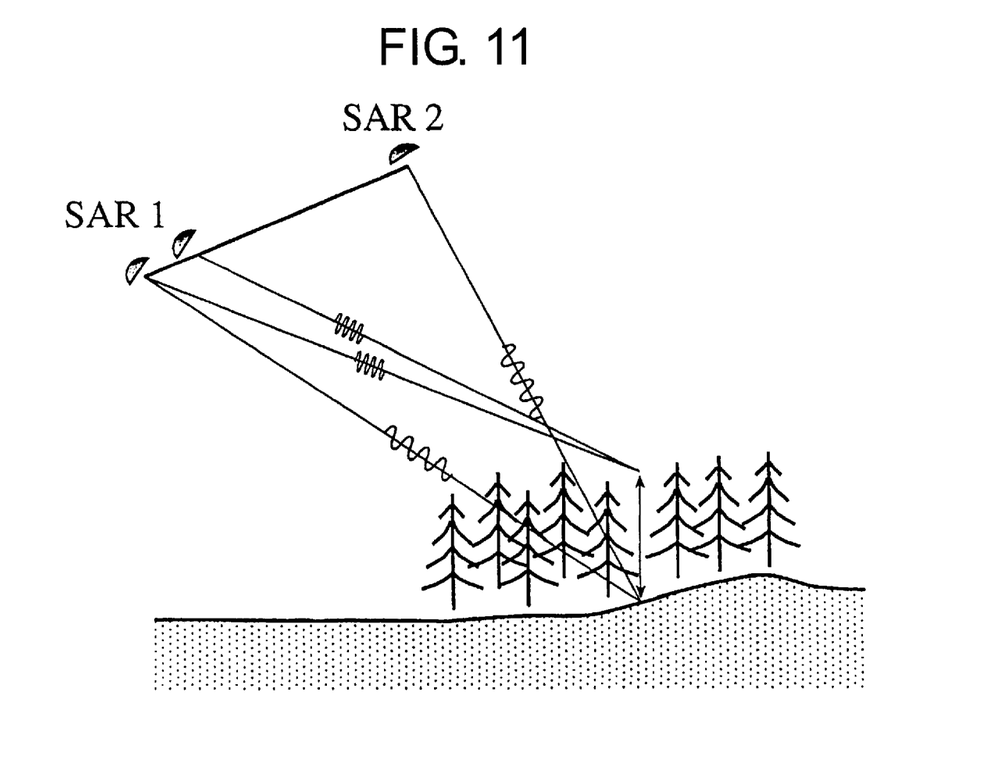
FIG. 11 shows an embodiment of a measuring method for determining the ground surface and the height of trees.

The choice of frequency bands for the SAR system affects the height inaccuracy according to the discussion above, but also what ground layer is measured. A measuring method for determining the ground surface and the height of trees illustrated in FIG. 11. A low frequency (<100 MHz) efficiently penetrates vegetation, which gives a possibility of mapping the ground surface, while a high frequency (>10 GHz) maps the uppermost layer of the vegetation. A low frequency needs a large base line, which can be achieved without true the ground objects by repeating the paths. The latter, however, is not possible at a high frequency but, on the other hand, does not require a large base line for the same resolution. The base line is scaled with the wavelength. Two antennae on the same platform are therefore used for the high frequency. By using separate frequencies, the difference in height between different scattering layers can thus be measured, for instance, the height of trees or between layers at different depths in the ground.

An example of broadband stereo SAR on the X band is summarised in Table 2. The expected inaccuracy in the height measurement is once more in the order of 1 m. The height measurement is also unambiguous since the fractional bandwidth >0.1. A different method is to abandon the requirement for broadband for the X band system if the thickness of the layer can be assumed to vary within a certain range from the ground surface. The broadband VHF system is in this case utilise to obtain unambiguity also for the X band system.

TABLE 2

Example of broadband stereo SAR on the X band.

| | |
|---|---|
| Centre frequency $f_c$ | 10 GHz |
| Bandwidth B | 2 GHz |
| Flying height H | 3000 m |
| Vertical base line $b_z$ | 2 m |
| Horizontal base line $b_y$ | 2 m |

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for generating a three-dimensional image of a ground area by means of a radar with a synthetic aperture which is moving in an essentially rectilinear manner and includes at least two antennae, comprising the steps of:

creating at least two images of the ground with a large difference in the angle of illumination, transmitting radar pulses with a fractional bandwidth which is larger than or equal to 0.1, and using in the computations an aperture angle which is larger than or equal to 0.1 radians, detecting reflected radar pulses from said transmitting radar pulses, said reflected radar pulses having amplitude and phase, for each transmitting radar pulse of said transmitting radar pulses, measuring and storing position data of the antenna transmitting and for each reflected radar pulses measuring and storing position data of the antenna receiving the reflected radar pulse, computing a two-dimensional SAR signal having an amplitude and phase per synthetic aperture, and, reconstructing a three-dimensional position topography of an area relative to said antenna position data, the topography being inverted from the measured SAR signals, determining a topography with a coarse resolution and with a limited depth of focusing using the amplitude of the SAR signals, and determining an unambiguous topography of a fine resolution using the phase of the SAR signals by comparing with a starting geometric signal model with the topography of the area and the position data of the antennae as input parameters.

2. A method as claimed in claim 1, and further comprising the step of:

advancing the platform such that at least two images of the ground are created with a great difference in the angle of incidence, which takes place from antenna positions that differ by a distance perpendicular to the platform path by the platform moving in time successively along two essentially parallel-displaced paths.

3. A method as claimed in claim 1, and further comprising the step of:

advancing the platform such that at least two images of the ground are created with a great difference in the angle of incidence, which takes place from antenna positions that differ by a distance perpendicular to the platform path by transmitting simultaneously radar signals from two antennae on the platform.

4. A method as claimed in claim 1, and further comprising the step of:

back-projecting the SAR signals to a three-dimensional computational grid along circles defined by the intersection between range cylinders and azimuth planes for each grid point, and setting a value given by interpolation of the SAR signals to the range and azimuth positions of the given point.

5. A method for generating a three-dimensional image of a ground area by means of a radar with a synthetic aperture which is moving in an essentially rectilinear manner, comprising the steps of:

creating at least two images of the ground with a large difference in the angle of illumination, transmitting radar pulses with a fractional bandwidth which is larger than or equal to 0.1, and using in the computations an aperture angle which is larger than or equal to 0.1 radians, detecting the reflected radar pulses with amplitude and phase, for each pulse, measuring and storing the position of the antenna transmitting and the antenna receiving the pulse, computing a two-dimensional SAR signal per synthetic aperture, starting from the amplitude and phase of the SAR signals and position data for the antennae, reconstructing a three-dimensional position topography, of an area relative to antenna position data, the topography being inverted from the measured SAR signals starting from a geometric signal model with the topography of the area and the position data of the antennae as input parameters, back-projecting the SAR signals to a three-dimensional computational grid along circles defined by an intersection between range cylinders and azimuth planes for each grid point, setting a value given by interpolation of the SAR signals to the range cylinders and azimuth planes of the given point, and maximising a vertical position in each horizontal position to determine in these horizontal positions a cross-correlation of the amplitude of the back-projected SAR signals.

6. A method as claimed in claim 5, and further comprising the step of:

determining a more accurate vertical position in each horizontal position by determining in each horizontal position the vertical position for which the back-projected SAR signals have the same phase value and which is closest to the previously determined vertical position.

7. A method as claimed in claim 1, and further comprising the step of:

filtering the SAR signals starting from the local inclination and the SAR measuring geometry such that the ground-projected resolution elements become identical.

8. A method as claimed in claim 1, and further comprising the step of:

carrying out the method at least at two center frequencies, which gives the position of different vegetation layers and/or ground layers.

9. A method as claimed in claim 1, and further comprising the steps of:

transmitting said radar pulses at least at one higher center frequency, and receiving said radar pulses at least at one higher center frequency, wherein said transmission taking place with a normal bandwidth.

10. A method as claimed in claim 1, and further comprising the step of:

creating at least two images of the ground with a great difference in the angle of incidence, which takes place from antenna positions that differ by a distance perpendicular to the platform path by transmitting alternately radar signals from two antennae on the platform.

* * * * *